No. 708,688. Patented Sept. 9, 1902.
H. WOODSON.
MUSIC TEACHING APPARATUS.
(Application filed Nov. 26, 1901.)
(No Model.) 5 Sheets—Sheet 1.
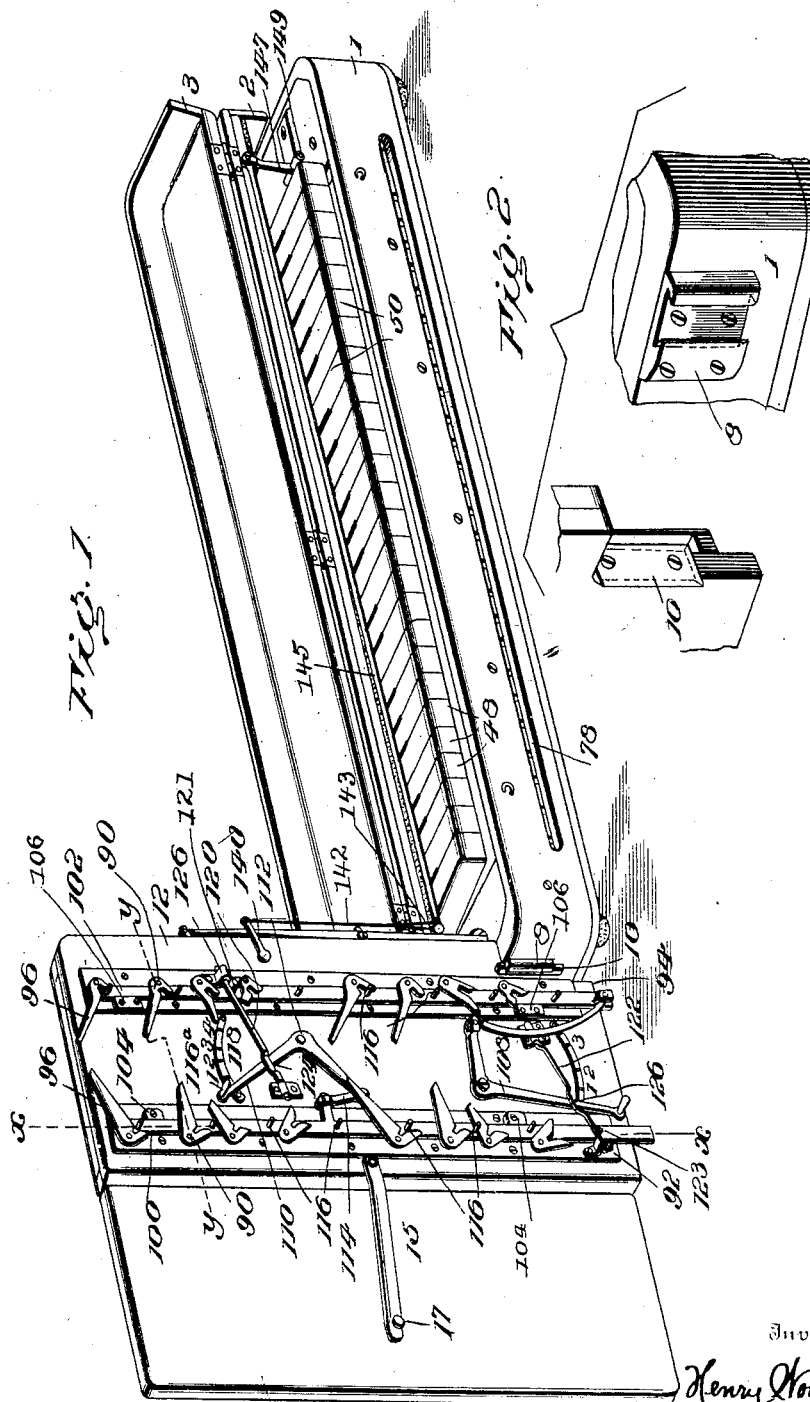
Witnesses
Geo. Imrie
Fred D. Jack
Inventor
Henry Woodson
By Thos. E. Robertson
Attorney No. 708,688. Patented Sept. 9, 1902.
H. WOODSON.
MUSIC TEACHING APPARATUS.
(Application filed Nov. 26, 1901.)
(No Model.) 5 Sheets—Sheet 2.
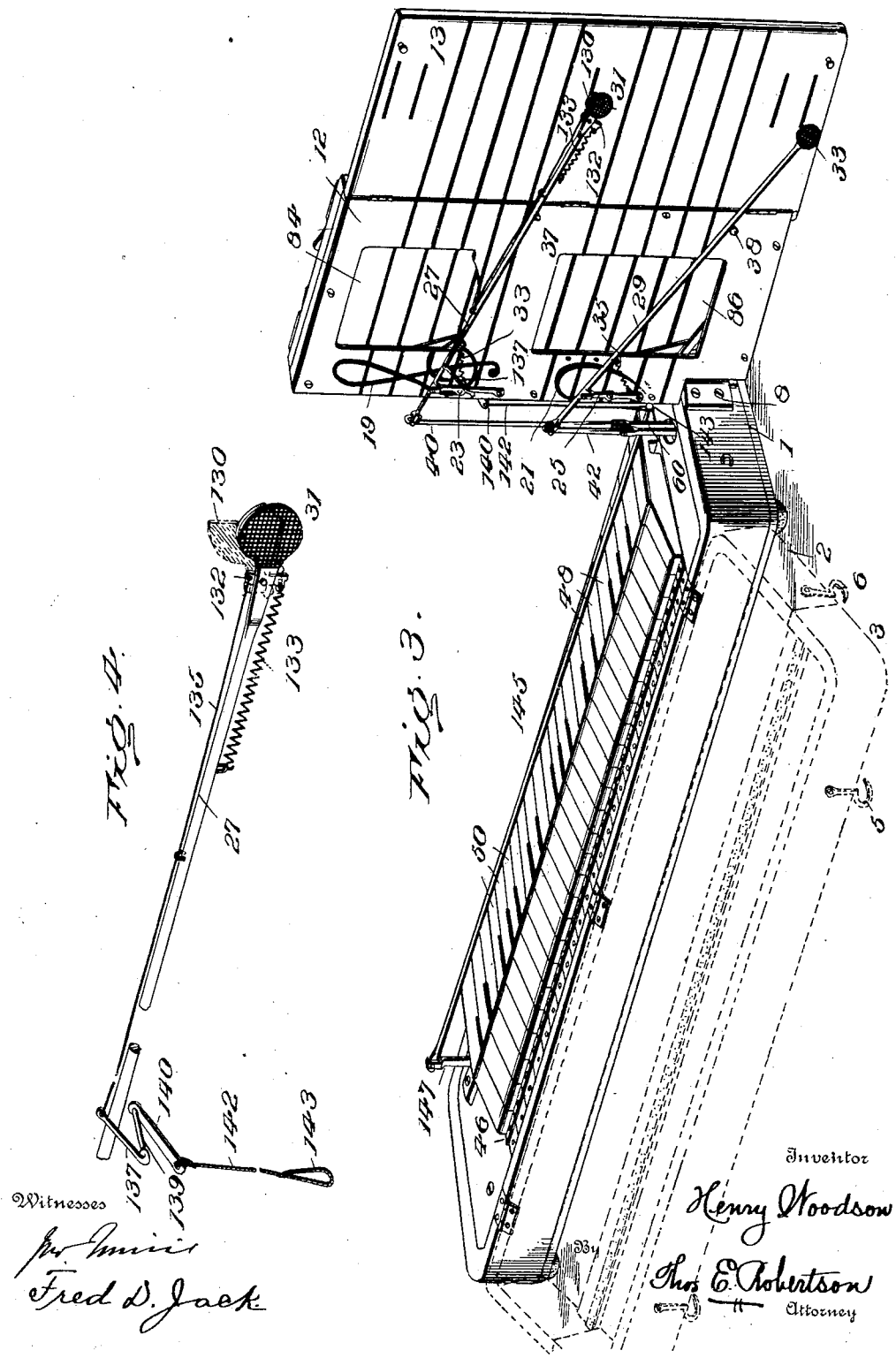
Witnesses
Fred D. Jack
Inventor
Henry Woodson
Thos. E. Robertson
Attorney
THE NORRIS PETERS CO., PHOTO-LITHO., WASHINGTON, D. C.

No. 708,688. Patented Sept. 9, 1902.
H. WOODSON.
MUSIC TEACHING APPARATUS.
(Application filed Nov. 26, 1901.)
(No Model.) 5 Sheets—Sheet 3.
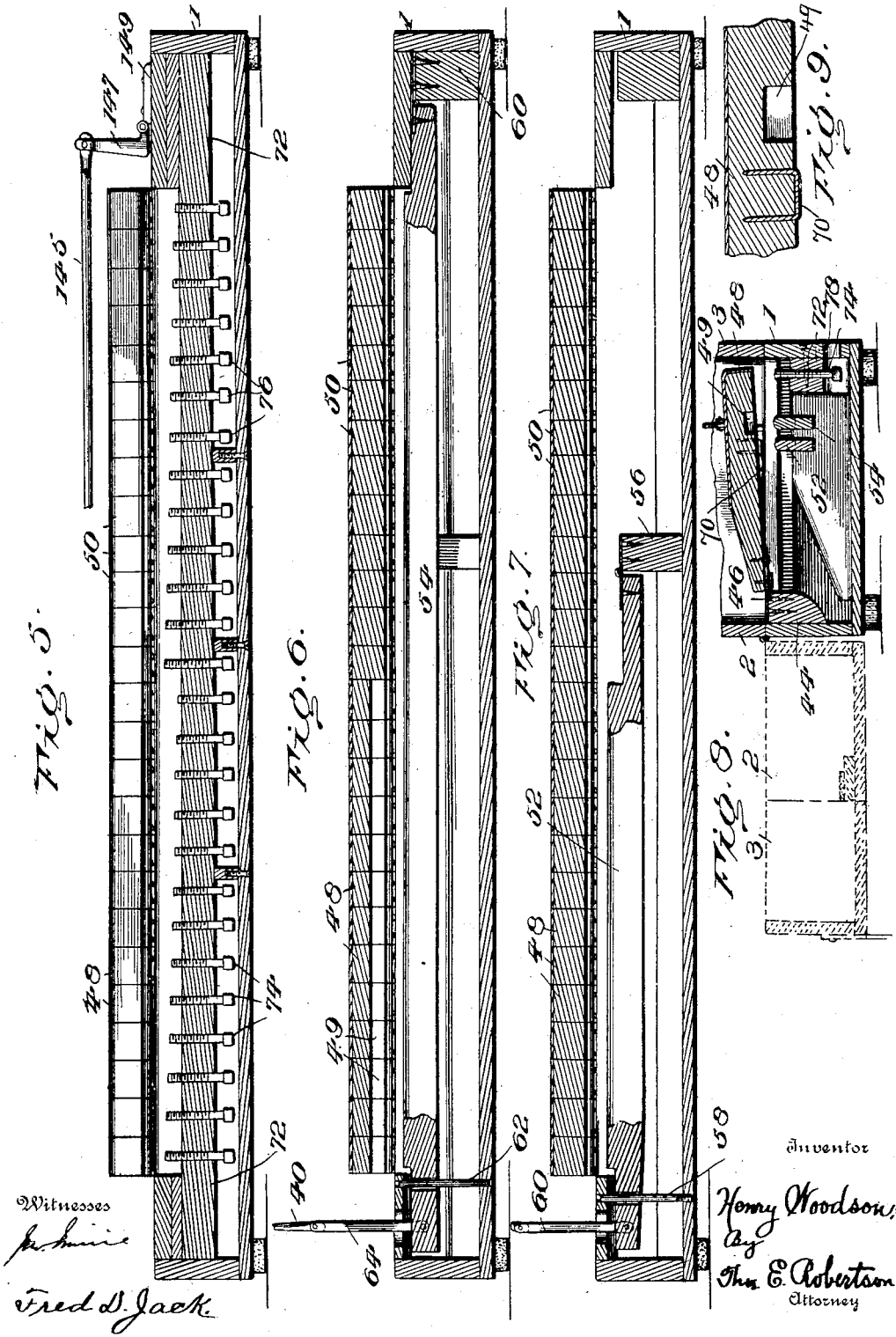

No. 708,688. Patented Sept. 9, 1902.
H. WOODSON.
MUSIC TEACHING APPARATUS.
(Application filed Nov. 26, 1901.)
(No Model.)
5 Sheets—Sheet 4.

Witnesses
Jw. Irvine
Fred D. Jack

Inventor
Henry Woodson
By Thos. E. Robertson
Attorney

No. 708,688. Patented Sept. 9, 1902.
H. WOODSON.
MUSIC TEACHING APPARATUS.
(Application filed Nov. 26, 1901.)
(No Model.) 5 Sheets—Sheet 5.
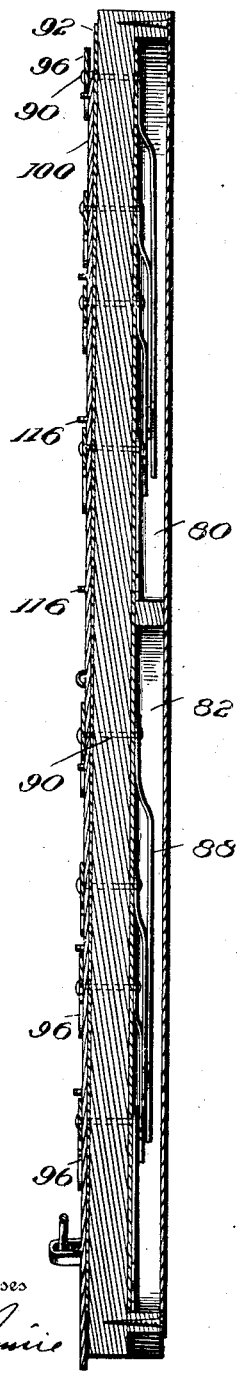
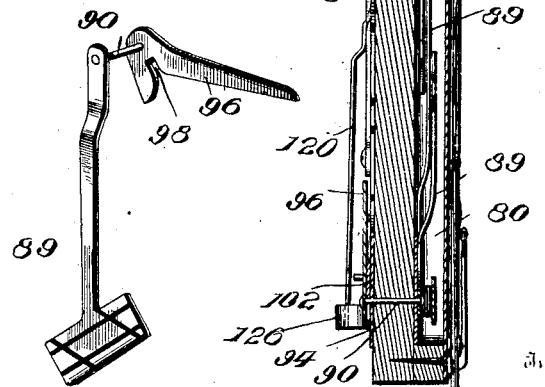

UNITED STATES PATENT OFFICE.

HENRY WOODSON, OF WINLOCK, WASHINGTON.

MUSIC-TEACHING APPARATUS.

SPECIFICATION forming part of Letters Patent No. 708,688, dated September 9, 1902.

Application filed November 26, 1901. Serial No. 83,787. (No model.)

*To all whom it may concern:*

Be it known that I, HENRY WOODSON, a citizen of the United States of America, and a resident of Winlock, in the county of Lewis and State of Washington, have invented certain new and useful Improvements in Music-Teaching Apparatus, of which the following is a specification.

This invention relates to an instrument or apparatus specially arranged and adapted for teaching music; and the main object of my invention is to produce an instrument or apparatus in which a keyboard is arranged to coöperate with a staff-board, so that an operator may press on the keys of the keyboard and move a note or notes on the staff-board to positions corresponding to the keys pressed.

With this object in view my invention consists in a music-teaching apparatus which is shown in what I now consider its preferable embodiment in the accompanying drawings and which is hereinafter more particularly described and then definitely set forth by the claims at the end hereof.

Figure 10:
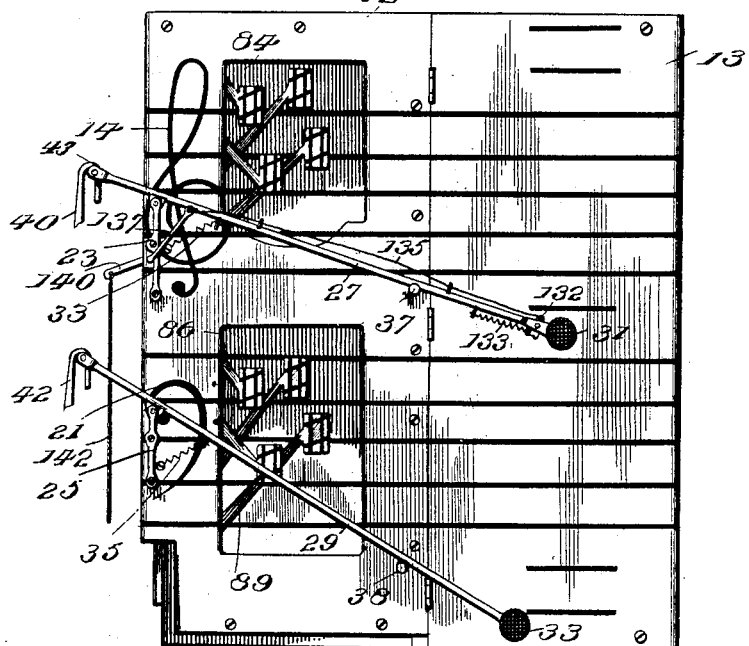
Figure 11:
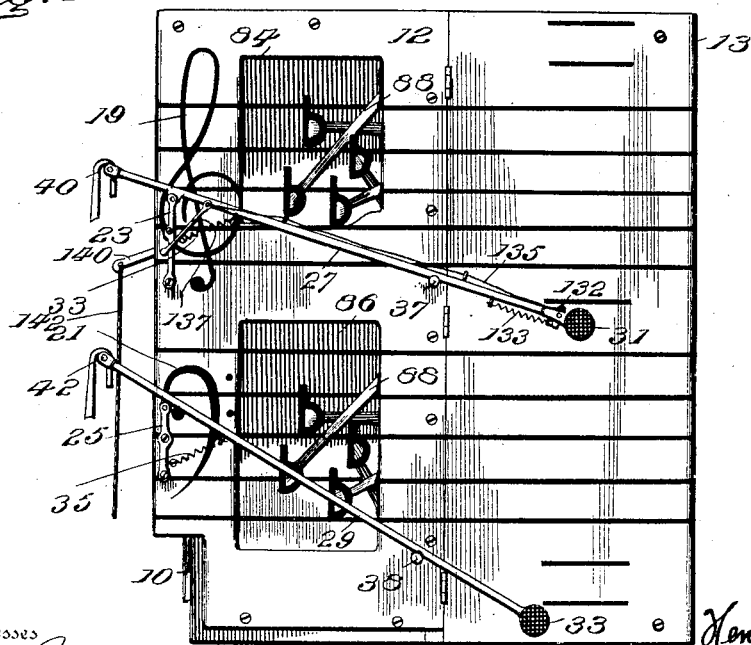

In the drawings accompanying this specification, Figure 1 is a perspective view of my complete apparatus open for use. Fig. 2 is a detached perspective of the device for locking the staff-board to the case containing the keyboard. Fig. 3 is a similar view to Fig. 1, but which is taken from the side viewed by the pupil and in which the case is represented in dotted lines as being thrown entirely open. Fig. 4 is a perspective view of the treble-note rod, showing an "accidental." Fig. 5 is a longitudinal vertical section of the keyboard, taken on a line running through the adjusting-screws. Fig. 6 is a similar section taken on a line running parallel with the "treble" lever. Fig. 7 is a similar section on a line paralleling the "bass" lever. Fig. 8 is a cross-section through both the treble and bass levers. Fig. 9 is a detail of one of the keys. Figs. 10 and 11 are side elevations of the staff-board, the former showing "sharps" displayed and the latter "flats." Fig. 12 is a vertical section through the staff-board on the line $x\ x$ of Fig. 1. Fig. 13 is a horizontal section through the lines $y\ y$ of the same figure. Figs. 14 and 15 are perspective views of the sharp and flat levers, respectively.

Referring now to the details of the drawings by numerals, (see more particularly Figs. 1 and 3,) 1 represents a case to which is hinged a two-part cover 2 and 3, the part 2 being hinged to the case 1 and the parts 2 and 3 being hinged together, so that the part 3 may be thrown back, as in Fig. 1, or both parts may be opened for repairs or whenever otherwise necessary, as seen in dotted lines in Fig. 3. Hooks or other equivalent locking means 5 and 6 are provided, by which the parts may be secured together when desirable. On one end of the case 1 a dovetailed socket or bracket 8 is secured in any approved manner, and this socket is for the purpose of receiving and supporting a correspondingly-shaped tongue 10, formed on the staff-board 12, this staff-board supporting musical characters, which are so connected with keys in the case as to be manually controlled as the keys are depressed. This staff-board is formed of a main part 12 and a supplemental part 13, hinged together, as shown, so as to be capable of folding, and provided with a brace 15, pivoted to the part 12 and coacting with a headed pin 17 on the part 13, whereby the two parts may be held in line with each other, as shown in Figs. 1, 3, and 13.

Before describing the keyboard I will first describe that part of the staff-board 12 13 necessary to enable one to understand the operation of the note characters. The staff-board is divided into two parts 19 and 21, the first forming a treble staff and the other the bass. On each of these staffs is fixedly secured brackets 23 and 25, and in the bracket 23 is fulcrumed or pivoted a treble-character rod 27 and in the other bracket a bass-character rod 29. The former supports at its outer extremity a note character 31, which I shall hereinafter designate as the "treble character," as it is displayed on the upper or treble staff, and the other rod supports a similar note character 33, which will be called the "bass character," as it is displayed before the lower staff. These character-rods 27 and 29 are provided with springs 33 and 35, which are arranged to draw the note characters down to their lowermost positions. Studs or pins 37 and 38 may be provided to prevent the characters from descending too far. Pitmen or connecting-rods 40 and 42 are connected, respectively, to the opposite ends of the character-rods 27 and 29, and it will be manifest that as either or both of these pitmen are drawn or pulled downward the note characters will be elevated and brought to position on their respective staffs. I will now describe the keyboard and its connections for operating these note characters by means of the pitmen or connecting-rods 40 and 42.

At the rear of the interior of the case 1 is secured a longitudinal supporting-rod 44, (see Fig. 8,) and to this rod are hinged, preferably by flexible spring-hinges 46, two series of keys 48 and 50, the former being the bass and the latter the treble keys. Underneath these keys are two levers 52 and 54. (See Figs. 6 and 7.) The lever 52 is under the bass keys only and is hinged at one end to a supporting-block 56 and at the opposite end is guided by a fixed guide-pin 58. The free end of the said bass lever is connected with a pivoted rod 60, which in turn is connected with the bass pitman 42, hereinbefore mentioned. Under all of the keys and situated, preferably, in front of the bass lever 52 is the treble lever 54, which extends the full length of the keyboard and is pivoted or hinged at one end to the fixed support 60 (see Fig. 6) and is guided exactly like the bass lever at the opposite end by a guide-pin 62, and its free end is similarly connected to a rod 64, pivotally connected with the pitman 40, heretofore described as being connected to the treble-character rod 27. All of the bass keys 48 are cut away or grooved at 49 (see Figs. 6 and 8) immediately over the treble lever 54, so that when the bass keys are depressed they will not move the treble lever. All of the keys have metallic bearing-surfaces 70 (see Fig. 9) to decrease the friction where they contact with the treble or base levers 52 or 54. Situated within the case 1 and immediately under the front end of the keys is a longitudinal support 72, in which are screwed two sets of adjusting-screws 74 and 76, (see Fig. 5,) which form stops to prevent the keys being depressed too far. The front of the case 1 is slotted at 78, (see Figs. 1 and 8,) so that a suitable key may be introduced to adjust these screws.

It follows from the constructions just described that when a key of the treble series, for instance, is depressed the key depressed acts on the treble lever 54 and depresses said lever until the key is prevented from further downward movement by its adjustable stop-screw 76, and the downward movement of the treble lever 54 will be transmitted, by means of the rod 64, pitman 40, and fulcrumed character-rod 27, to the note character 31. It will be obvious that if the adjustable screws 76 be adjusted, as seen in Fig. 5, so as to be graduated, each key will from the left to the right move the note character farther upward, and if the screws 76 be carefully adjusted each key will move the note character to its respective place on the staff. As the sharps and flats will be hereinafter separately described, it may here be mentioned that the black portion of the keyboard, representing the sharps and flats, is merely painted or embossed thereon, as it serves no other purpose than to simulate the ordinary keyboard. It should also have been mentioned that the upper ends of the pitmen 40 and 42 are hook-shaped, (see 43 in Fig. 10,) so that when the staff-board is detached from the keyboard the parts may be easily disconnected, and as the said pitmen 40 and 42 are pivotally connected to the rods 60 and 64 they may be folded down onto the keys when the case is shut for packing or transportation.

I will next describe the mechanism for indicating in what key the musical characters are to be represented on the staff-board. The main part 12 of the staff-board is made with recessed portions 80 and 82, (see particularly Figs. 12 and 13,) and openings 84 and 86 are formed in the face of the staff-board, (see Figs. 3, 10, and 11,) which are of smaller size than said recesses 80 and 82, so that there is room on each side of said recesses for concealing two sets of sharps and flats. The two sets of sharps are arranged on one side and the two sets of flats on the opposite side, so that they may be projected outward and be visible through the openings 84 and 86, as clearly shown in said Figs. 10 and 11. These sharps and flats are connected to separate or independent crank-arms 88 and 89, (see Figs. 14 and 15,) and these arms are fixed to axles 90, so as to enable their sharps and flats to be swung into their respective positions. For this purpose the crank-arms 88 and 89 must be of different lengths, so as to properly pass each other and swing into the positions on the staff they must necessarily occupy to give their proper meaning. The axles 90 are continued through the staff-board and through plates 92 and 94. In my drawings I have illustrated four sharps and four flats for each clef; but it is obvious that there may be provision for six sharps and six flats in order to provide for all the keys from C-major to G-flat and F-sharp and their relative minors. As there are four sharps for the treble and four for the bass on one side of the openings 84 and 86 and four flats for the treble and four for the bass on the opposite side, there are eight of these axles 90 on each side. To each axle is rigidly secured a cam-lever 96, and each cam-lever and its crank-arm and its sharp or flat move in unison. The cam-levers are each provided with a slot 98, forming a means of engagement with a stud or pin, to be described. For each set of eight sharps or eight flats is arranged a signature-slide, there being one slide 100 on one side for the flats and one slide 102 on the opposite sides for the sharps. These slides are held in position on one side by the before-described axle 90 and on the opposite side by blocks 104 and 106, (see Fig. 1,) and the slides are, as their name suggests, adapted to slide up and down and to give them sliding movement. When necessary, I employ two signature-levers 108 and 110. As these levers are similar in construction and operation, a description of one will suffice. The lever 110 is pivoted at 112 and has one arm connected to the signature-slide 100 by means of a pivoted link 114, and at its free end the lever 110 is provided with a handle 116ª, by which the lever may be moved. A quadrant 118 is provided for each lever, and each quadrant has five notches, one for zero and one for each sharp or flat, the arrangement being such that when a sharp-lever is in the zero-notch no sharps will be displayed. When it is in the first notch from zero, one sharp will appear; in the second, two sharps, and so on. Each of the signature-slides 102 and 100 is provided with a number of studs 116, there being one stud for each cam-lever 96. These studs are arranged to coöperate with the cam-levers, so that when one of the signature-slides is raised by its lever 110 the studs 116 will engage the cam-notches 98 in the cam-levers 96 and rotate the cam-levers and their axles 90, thus simultaneously moving the crank-arms 88 with their sharps or flats, as the case may be. The studs are so distanced and the cam-levers so shaped that the studs progressively engage the cam-levers, so as to move first one, then the second, then the third, and finally the fourth. They are also so arranged that the first and fifth studs, the second and sixth, and so on, engage their respective cam-levers simultaneously, so that the same number of sharps (or flats) will be simultaneously displayed in the treble and bass openings 84 and 86. Likewise the notches in the quadrants 118 are so spaced that when the lever 110 rests in any notch the sharps (or flats) will appear in their appropriate places on the staff. In order to lock the sharp signature-slide, so as to keep it from being moved when flats are displayed, or vice versa, I employ two spring-locks 120 and 122, which coact with two studs 121 and 123 on the signature-slides 102 and 100, respectively. These spring-locks have inwardly-bent portions 124 and 126, arranged so that when the levers 110 and 108 are in the zero-notches they will be immediately under said portions 124 and 126, the arrangement being such that when the lever 110, for instance, is moved even to the first notch the said lever 110 moves from under said inwardly-bent portion 124 and the lock 120 by reason of its resiliency springs slightly inward, and in doing so its end, which is guided in the guide-bracket 126, also moves inward and moves in the path of the stud 121, thus preventing the signature-slide 102 from being moved as long as the other slide 100 is displaying its symbols. Of course as soon as the lever 110 is moved to zero it moves under the inwardly-bent portion 124, and thus lifts the outer end of the lock 120 from the path of the stud 121, so that the signature-slide 102 may now be moved; but as soon as this signature-slide 102 is moved by its lever 108 the opposite signature-slide 100 is locked (in a similar manner) by the spring-lock 122 and the stud 123.

With the mechanism so far described it will be possible to display any musical note on the staff except an accidental, and this may be done by the following-described means.

130 (see Figs. 3 and 4) represents an accidental, which is normally hidden behind the treble note character 31 and is of a contrasting color, (as red,) so as to make it more easily noticed when brought into view. This accidental is formed on or connected with a rocking lever 132, pivoted on the character-rod 27, a spring 133 being employed to normally retain the accidental behind the note character 31. To the upper end of this lever 132 is connected a fine wire or cord 135, the other end of which is connected to a crank-arm 137, rigidly connected to a spindle 139, (see Fig. 4,) which is journaled in the staff-board 12 and has connected to its other end a second crank-arm 140, to which is connected a fine wire or cord 142, with a loop 143 in its free end adapted to be looped over the end of a wire rod 145, which extends over all the keys and is pivotally supported at its opposite end by means of a standard 147, pivotally secured to a plate 149 on the case 1. The result of this construction is such that as the rod 145 is over all of the treble keys the rod 145 may be depressed simultaneously with the proper key when it is desired to designate an accidental on the staff. The standard 147 is pivoted to the plate 149, so that when the wire or cord 142 is disconnected from the rod 145 the standard may be slightly moved on its pivot until the rod rests on the keys, and the cover 3 can then be closed without doing injury to the parts.

It is believed the foregoing description is in sufficient detail to make it unnecessary to give a detailed description of the operation, and it will therefore be sufficient to state that a teacher may operate the keys and through the described connections cause the treble or bass note characters to move to any desired part of the staff-board in order to represent any note or tone and that by moving the signature-levers 108 and 110 the desired number of sharps or flats may be displayed in their proper places to indicate the proper key. In this way a teacher is enabled to improvise such music as he may desire the pupil to sing or play and prevents him from committing to memory until they are sufficiently advanced to be able to play the desired grade of music at sight.

I have herein described the form of my invention that I now consider its preferable embodiment; but I do not limit myself to the various constructions shown, as my invention may be varied and modified without departing from its characteristic features.

What I claim as new is—

1. In a music-teaching apparatus, a staff, and a single musical character coöperating with said staff, in combination with a keyboard having a number of keys operatively connected with said single character, whereby the movement of any of the keys connected with said character moves the latter with reference to said staff, substantially as described.

2. In music-teaching apparatus, treble and bass staffs, musical characters, one of said characters coöperating with each of said staffs, in combination with a keyboard having certain keys operatively connected with one of said characters, and other keys operatively connected with the other character, whereby the movement of certain of said keys moves one of said characters, and the movement of other keys operates the other character, substantially as described.

3. In music-teaching apparatus, a staff, and a single musical character coöperating with said staff, in combination with a keyboard, and operative connections between the keys of said keyboard and said single character, said connections being such that the movement of the keys imparts varying movement to said character, substantially as described.

4. In music-teaching apparatus, treble and bass staffs, musical characters, there being one character for each staff, in combination with a keyboard having part of its keys operatively connected with one character, and other keys connected with the other character, the connections between said keyboard and characters being such that the movements of certain keys cause varying action of one character and the movements of other keys cause varying movements of the other character, substantially as described.

5. In music-teaching apparatus, the combination of a keyboard, a staff-board detachably connected with said keyboard, and a single musical character coöperating with said staff-board, the said keyboard having a number of keys operatively connected with said single character, whereby the movement of any of the keys connected with said character moves the latter with reference to said staff-board, substantially as described.

6. In music-teaching apparatus, a staff-board, said staff-board folding upon itself, and a single musical character coöperating with said staff-board, in combination with a keyboard having a number of keys operatively connected with said single character, whereby the movement of any of the keys connected with said character moves the latter with reference to said staff-board, substantially as described.

7. In music-teaching apparatus, the combination of a staff, and a single musical character coöperating with said staff, a keyboard having a number of keys operatively connected with said single character, whereby the movement of any of the keys connected with said character moves the latter with reference to said staff, sharps and flats, and mechanism for controlling the same, substantially as described.

8. In music-teaching apparatus, the combination of a staff, and a single musical character coöperating with said staff, a keyboard, operative connections between the keys of said keyboard and said single character, said connections being such that the movements of the keys impart varying movements to said character, sharps and flats, and mechanism for controlling the same, substantially as described.

9. In music-teaching apparatus, the combination of a staff, and a single musical character coöperating with said staff, a keyboard, operative connections between the keys of said keyboard and said single character, said connections being such that the movements of the keys impart varying movements to said character, sharps and flats, and mechanism for controlling the same comprising a lever and intermediate connections, substantially as described.

10. In a music-teaching apparatus, a staff-board having a recess or opening therein, sharps and flats normally hidden behind the board, the sharps being hidden on one side of the recess and the flats on the other, and mechanism for moving said sharps or flats to exhibit them through said opening from opposite sides thereof, substantially as described.

11. In music-teaching apparatus, a staff-board having a series of sharps and a series of flats on one side thereof, hand-levers on the opposite side of said staff-board controlling the movements of said sharps and flats, and intermediate connections between said levers and said sharps and flats, substantially as described.

12. In music-teaching apparatus, a staff-board having an opening or recess therein, series of sharps and flats normally located behind the walls of said recess and on opposite sides thereof, a hand-lever for the sharps and a hand-lever for the flats, both on the rear side of the staff-board, and intermediate connections between the levers and said sharps and flats, substantially as described.

13. In music-teaching apparatus, a staff having a series of characters thereon and means for controlling the positions of said characters comprising a cam-lever and reciprocating stud or pin for each character, substantially as described.

14. In music-teaching apparatus, a staff having a series of characters thereon and means for controlling the positions of said characters comprising a cam-lever and reciprocating stud or pin for each character, said levers combined with mechanism to progressively display said characters on said staff, substantially as described.

15. In music-teaching apparatus, a staff, a series of sharps and flats pivotally mounted with relation to said staff, mechanism for moving the sharps on their pivots, mechanism for moving said flats on their pivots, each of said mechanisms comprising cam-levers and reciprocating studs or pins and a lock arranged to lock one of said mechanisms when the other mechanism is being moved, substantially as described.

16. In music-teaching apparatus, a staff, a series of musical characters, a lever connected with each of said characters, a slide having means coöperating with all of said levers for controlling the position of said characters, and a hand-lever for operating said slide, substantially as described.

17. In music-teaching apparatus, a staff, a series of musical characters, a series of levers connected with said characters, a slide having studs coöperating with said levers, and a lever for operating said slide and said first-mentioned levers and a quadrant for holding said lever, substantially as described.

18. In a music-teaching apparatus, a staff, a series of musical characters arranged to be displayed thereon, a cam-lever and reciprocating studs or pins for each character, and means for operating said cam-levers; the said cam-levers being arranged to progressively display the said musical characters, substantially as described.

19. In music-teaching apparatus, a staff having an opening therein, a series of sharps and flats concealed by said staff, and mechanism for displaying said characters through said openings, comprising a lever and a reciprocating stud or pin for each sharp and flat, substantially as described.

20. In music-teaching apparatus, a staff having a character-rod pivoted thereon, a character supported by said rod, and a keyboard having its keys connected with said character-rod and imparting varying movements thereto, substantially as described.

21. In music-teaching apparatus, a staff, a musical character supported thereon, a keyboard having its keys arranged to move said character varying distances, an accidental concealed behind said character, and means for displaying said accidental, substantially as described.

22. In music-teaching apparatus, a staff having a musical character thereon, in combination with a keyboard having a series of keys, a lever under said keys arranged to be depressed thereby and having connections with the character on said staff, and means whereby the different keys impart varying movements to said character, substantially as described.

23. In music-teaching apparatus, a staff having two cleffs thereon, a musical character for each cleff, in combination with a keyboard, levers under said keyboard arranged to be operated by said keys, connections between one of said levers and one of said musical characters and connections between the other lever and the other musical character, means whereby the different keys impart varying movements to said character, substantially as described.

24. In music-teaching apparatus, a staff having treble and bass characters arranged to be displayed thereon, in combination with a keyboard, bass and treble levers under said keys, the treble lever being connected with the treble character and the bass lever with the bass character, and means for causing the keys of said keyboard to operate said characters varying distances, substantially as described.

25. In music-teaching apparatus, a staff having a musical character arranged to be displayed thereon, in combination with a keyboard having its keys arranged to move said character, and adjustable stops under said keys, whereby the movements of said keys may be graduated, substantially as described.

Signed by me at Castle Rock, Cowlitz county, Washington, this 18th day of November, 1901.

HENRY WOODSON.

Witnesses:
R. BREWER,
JOHN H. PAULY.